(12) United States Patent
Ishida

(10) Patent No.: US 11,633,957 B2
(45) Date of Patent: Apr. 25, 2023

(54) RECORDING METHOD AND RECORDING APPARATUS

(71) Applicant: Seiko Epson Corporation, Tokyo (JP)

(72) Inventor: Kohei Ishida, Matsumoto (JP)

(73) Assignee: SEIKO EPSON CORPORATION

( * ) Notice: Subject to any disclaimer, the term of this patent is extended or adjusted under 35 U.S.C. 154(b) by 245 days.

(21) Appl. No.: 16/802,922

(22) Filed: Feb. 27, 2020

(65) Prior Publication Data
US 2020/0276827 A1  Sep. 3, 2020

(30) Foreign Application Priority Data
Feb. 28, 2019  (JP) .............................. JP2019-035556

(51) Int. Cl.
*B41J 2/21* (2006.01)
*C09D 11/54* (2014.01)
(Continued)

(52) U.S. Cl.
CPC .............. *B41J 2/2114* (2013.01); *B41J 2/211* (2013.01); *B41J 2/2146* (2013.01);
(Continued)

(58) Field of Classification Search
CPC ... C09D 11/326; C09D 11/033; C09D 11/324; C09D 11/38; C09D 11/36; C09D 11/322; C09D 11/037; C09D 11/102; C09D 11/107; C09D 11/40; C09D 11/54; C09D 11/30; C09D 11/32; C09D 11/328; C09D 11/101; C09D 11/005; C09D 11/52; C09D 11/106; B41J 2/14; B41J 2202/01; B41J 2/18;
(Continued)

(56) References Cited

U.S. PATENT DOCUMENTS

2003/0142168 A1 *  7/2003  Suzuki .................... B41J 2/2114
                                                        347/43
2004/0189772 A1 *  9/2004  Arai ..................... B41J 11/00212
                                                        347/102
(Continued)

FOREIGN PATENT DOCUMENTS

JP    2005262553 A  *  9/2005  ............ B41J 2/2117
JP    2006-240094 A      9/2006
(Continued)

*Primary Examiner* — Manish S Shah
(74) *Attorney, Agent, or Firm* — Harness, Dickey & Pierce, P.L.C.

(57) ABSTRACT

A recording method for using a line-type recording apparatus to scan a recording medium with a plurality of line heads once for recording, the line heads having a width greater than or equal to the recording width of the recording medium, the method including a treatment liquid deposition step of depositing a treatment liquid containing a coagulant on the recording medium, and an ink deposition step of ejecting a coloring ink composition from the line heads to deposit the coloring ink composition on the recording medium, wherein in the ink deposition step an identical coloring ink composition is ejected from a first line head placed on the upstream side in the transport direction perpendicular to the width direction of the recording medium and from a second line head placed on the downstream side in the transport direction.

18 Claims, 2 Drawing Sheets

(51) Int. Cl.
*C09D 11/322* (2014.01)
*C09D 11/40* (2014.01)
*B41M 5/00* (2006.01)
*B41J 11/00* (2006.01)

(52) U.S. Cl.
CPC ........ *B41J 11/0021* (2021.01); *B41J 11/0022* (2021.01); *B41J 11/0024* (2021.01); *B41M 5/0017* (2013.01); *C09D 11/322* (2013.01); *C09D 11/40* (2013.01); *C09D 11/54* (2013.01); *B41J 11/002* (2013.01)

(58) Field of Classification Search
CPC ... B41J 2/17; B41J 2/175; B41J 2/2114; B41J 2/211; B41J 2/2146; B41J 11/0021; B41J 11/0022; B41J 11/0024; B41J 11/002; B41J 2/2117; B41J 2/01; B41J 2/1433; B41J 2/17593; B41J 2/2107; B41J 2/1755; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 25/001; B41J 25/34; B41J 25/003; B41J 25/312; B41J 2025/008; B41J 2202/21; B41J 2/17596; B41J 2/16508; B41J 2/1652; B41J 2/17563; B41M 5/0023; B41M 5/00; B41M 5/0017; B41M 5/0047; B41M 5/0064; B41M 5/0011; B41M 7/00; B41M 7/0072; B41M 5/52; B41M 5/5218; B41M 5/5227; D06P 5/30; D06P 1/525; D06P 1/5285; D06P 3/04; D06P 3/24; D06P 3/52; D06P 3/60
See application file for complete search history.

(56) References Cited

U.S. PATENT DOCUMENTS

| | | | |
|---|---|---|---|
| 2005/0179725 A1* | 8/2005 | Matsushima | B41J 2/2117 347/40 |
| 2006/0098068 A1* | 5/2006 | Hakamada | C09D 11/54 347/100 |
| 2006/0197802 A1 | 9/2006 | Konno | |
| 2011/0109673 A1* | 5/2011 | Usuda | B41J 2/2114 347/9 |
| 2011/0187789 A1* | 8/2011 | Saito | B41J 2/015 347/100 |
| 2011/0205290 A1* | 8/2011 | Tojo | B41J 2/2114 347/21 |
| 2011/0221805 A1* | 9/2011 | Yoshida | B41J 2/04541 427/265 |
| 2012/0320123 A1* | 12/2012 | Takeda | C09D 11/322 347/21 |
| 2015/0091974 A1 | 4/2015 | Aoyama et al. | |
| 2016/0129702 A1* | 5/2016 | Katagami | B41J 11/002 347/102 |
| 2020/0131394 A1 | 4/2020 | Fujii et al. | |
| 2022/0289996 A1 | 9/2022 | Fujii et al. | |

FOREIGN PATENT DOCUMENTS

| | | |
|---|---|---|
| JP | 2007-331239 A | 12/2007 |
| JP | 2009-045794 A | 3/2009 |
| JP | 2015-091640 A | 5/2015 |
| WO | 2019-004485 A1 | 1/2019 |

* cited by examiner

RECORDING METHOD AND RECORDING APPARATUS

The present application is based on, and claims priority from, JP Application Serial Number 2019-035556, filed Feb. 28, 2019, the disclosure of which is hereby incorporated by reference herein in its entirety.

BACKGROUND

1. Technical Field

The present disclosure relates to a recording method and a recording apparatus.

2. Related Art

Ink jet recording methods can be used to record high-resolution images with relatively simple apparatuses and are being rapidly developed in various fields. Image quality has been widely studied through such development. For example, JP-A-2015-91640 discloses a recording method for ejecting a treatment liquid and an ink composition from a line head with respect to an improvement in dot landing accuracy and a reduction in printing time.

In recording methods involving the use of such a treatment liquid, ink droplets from a line head landing on a recording medium react with the treatment liquid and are rapidly fixed to the recording medium, thus advantageously forming an image with less bleeding or color mixing. Rapidly fixed ink droplets, however, tend to cause poor filling in images and tend to form a white spot, which is not filled with the ink, in images.

SUMMARY

A recording method according to the present disclosure is a recording method for using a line-type recording apparatus to scan a recording medium with a plurality of line heads once for recording, the line heads having a width greater than or equal to the recording width of the recording medium, the method including a treatment liquid deposition step of depositing a treatment liquid containing a coagulant on the recording medium, and an ink deposition step of ejecting a coloring ink composition from the line heads to deposit the coloring ink composition on the recording medium, wherein in the ink deposition step an identical coloring ink composition is ejected from a first line head placed on the upstream side in the transport direction perpendicular to the width direction of the recording medium and from a second line head placed on the downstream side in the transport direction.

In the ink deposition step of the recording method, a coloring ink composition different from the identical coloring ink composition ejected from the first line head and the second line head may be ejected from a third line head placed between the first line head and the second line head.

In the ink deposition step of the recording method, an identical coloring ink composition different from the identical coloring ink composition ejected from the first line head and the second line head may be ejected from a line head placed on the upstream side in the transport direction and from a line head placed on the downstream side in the transport direction and may be deposited on the recording medium.

In the recording method, the ink deposition step may be performed while the recording medium is transported in the transport direction at a transport speed of 30 m/min or more.

The recording method may further include a heating step of heating the recording medium before or during the ink deposition step, wherein the coloring ink composition is deposited on the heated recording medium in the ink deposition step.

In the ink deposition step of the recording method, the coloring ink composition may be deposited on the recording medium with a surface temperature of 45° C. or less.

In the recording method, the coloring ink composition may contain an organic solvent, and the organic solvent content may be 15% or less by mass of the total amount of the coloring ink composition.

In the recording method, the coloring ink composition may contain an organic solvent with a normal boiling point in the range of 170° C. to 280° C.

In the recording method, the coloring ink composition may contain an alkanediol solvent or a glycol ether solvent as the organic solvent.

In the recording method, the coloring ink composition may contain fine resin particles, and the fine resin particle content may range from 1% to 15% by mass of the total amount of the coloring ink composition.

In the recording method, the recording medium may be a non-absorbing recording medium.

In the recording method, the maximum amount of the coloring ink composition deposited may range from 5 to 15 mg/inch$^2$.

In the ink deposition step of the recording method, a white ink composition containing a white coloring material may be ejected from the line heads and may be deposited on the recording medium.

In the recording method, the identical coloring ink composition may be a non-white ink composition, in the ink deposition step a white ink composition containing a white coloring material may further be ejected from the line heads and may be deposited on the recording medium, and the number of line heads from which the white ink composition is ejected may be smaller than the number of line heads from which the identical coloring ink composition is ejected.

In the recording method, an image of the white ink composition and an image of the non-white ink composition may overlap, and the line heads from which the white ink composition is ejected may be located in the transport direction downstream of the first line head and the second line head from which the identical coloring ink composition is ejected.

A recording apparatus according to the present disclosure is a line-type recording apparatus for scanning a recording medium with a plurality of line heads once for recording, the line heads having a width greater than or equal to the recording width of the recording medium, the line-type recording apparatus including a treatment liquid deposition mechanism of depositing a treatment liquid containing a coagulant on the recording medium and a first line head and a second line head as the line heads to eject an identical coloring ink composition for recording, the first line head being placed on the upstream side in the transport direction of the recording medium, the second line head being placed on the downstream side in the transport direction of the recording medium.

DESCRIPTION OF EXEMPLARY EMBODIMENTS

Figure 1:
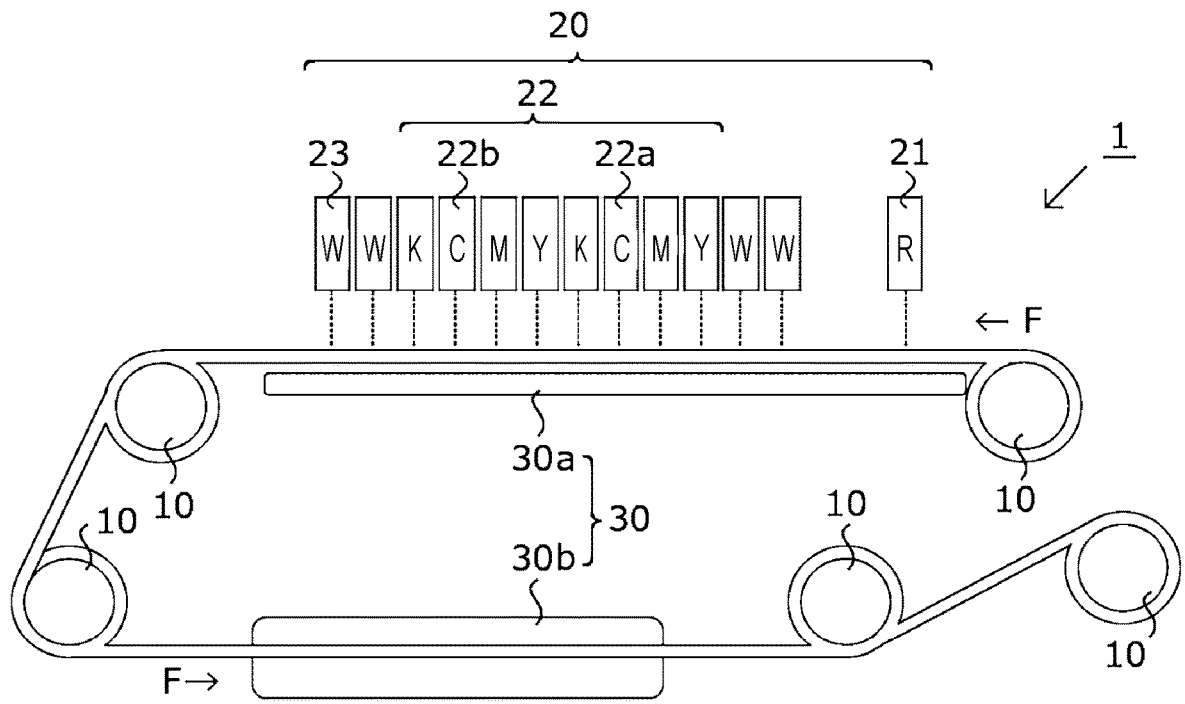
FIG. 1 is a schematic view of a line-type recording apparatus usable in one embodiment and is a schematic view of a line head arrangement example 1.

Although the embodiments of the present disclosure (hereinafter referred to as "the present embodiments") are described in detail below with reference to the accompanying drawings as required, the present disclosure is not limited to these embodiments, and various modifications may be made in these embodiments without departing from the gist of the present disclosure. Like components are denoted by like reference numerals throughout the figures and are not described again. Unless otherwise specified, the positional relationship, such as up, down, left, or right, is based on the positional relationship on the figures. The dimensions of components are not limited to the dimensions on the figures.

1. Recording Method

A recording method according to the present embodiment is a recording method for using a line-type recording apparatus to scan a recording medium with a plurality of line heads once for recording, the line heads having a width greater than or equal to the recording width of the recording medium. More specifically, the method includes a treatment liquid deposition step of using the recording apparatus to deposit a treatment liquid containing a coagulant on the recording medium and an ink deposition step of ejecting a coloring ink composition from the line heads to deposit the coloring ink composition on the recording medium, wherein in the ink deposition step an identical coloring ink composition is ejected from a first line head placed on the upstream side in the transport direction perpendicular to the width direction of the recording medium and from a second line head placed on the downstream side in the transport direction.

In known recording methods, an identical coloring ink composition is ejected from one line head. These methods, however, produce poor filling in images. Thus, in the present embodiment, an identical coloring ink composition is ejected from two or more line heads. This enables the identical coloring ink composition to be deposited on a recording medium at two or more time points in a single pass and thereby improves filling in images. This is probably because the reactivity of the coloring ink composition with a treatment liquid is different between the case where the coloring ink composition is deposited on the recording medium and then reacts with the treatment liquid and the case where there is the coloring ink composition that has already reacted with the treatment liquid on the recording medium. More specifically, an initial fraction of the coloring ink composition to react with a treatment liquid reacts rapidly with the treatment liquid and thereby contributes to the formation of an image with less bleeding or color mixing, and the reaction of the initially deposited ink proceeds over time before the second or later fraction of the coloring ink composition is deposited. Thus, the second or later fraction of the coloring ink composition deposited can easily spread over the recording medium and contributes to the formation of an image with good filling.

The term "line head", as used herein, refers to an ink jet head that is fixed to an ink jet apparatus and has a width greater than or equal to the recording width of a recording medium. The term "line-type", as used herein, means that ink droplets are ejected from a nozzle of a line head while a recording medium is transported in the transport direction (in the longitudinal direction of the recording medium) to record an image on the recording medium. The scanning direction is opposite to the transport direction. In the line type, recording can advantageously be performed at high speed in a single scan. A recording medium is scanned only once with one line head, and one line head forms a deposit in a single scan.

First, a line-type recording apparatus is described with reference to FIG. 1, and each step is then described in detail. FIG. 1 is a schematic view of a line-type recording apparatus usable in the present embodiment. As illustrated in FIG. 1, an ink jet recording apparatus 1 includes a transport unit 10 for a recording medium F, a recording unit 20, and a heating unit 30.

The transport unit 10 is configured to transport the recording medium F to the recording unit 20. More specifically, the transport unit 10 has feed rollers and is configured to further transport the transported recording medium F downstream to the recording unit 20 in the feed direction F.

The recording unit 20 includes a treatment liquid deposition mechanism 21 for depositing a treatment liquid on the recording medium F transported through the transport unit 10, a line head 22 for ejecting a coloring ink composition, and a line head 23 for ejecting a white ink composition. Transporting the recording medium F in the transport direction enables the recording medium F to be scanned once with a plurality of line heads.

The line head 22 for ejecting a coloring ink composition includes two or more line heads 22a and 22b for ejecting an identical coloring ink composition. Among the line heads for ejecting an identical coloring ink composition, a line head placed on the upstream side in the transport direction perpendicular to the width direction of the recording medium is referred to as the first line head 22a, and a line head placed on the downstream side in the transport direction is referred to as the second line head 22b. Also for a white ink composition, when two line heads placed in the transport direction in the figure upstream of a line head for ejecting a coloring ink composition other than the white ink composition are used for recording, the two line heads correspond to two line heads for ejecting an identical coloring ink composition. When two line heads placed in the transport direction in the figure downstream of a line head for ejecting a coloring ink composition other than the white ink composition are used for recording, the two line heads correspond to two line heads for ejecting an identical coloring ink composition.

The term "identical", as used herein, refers to ink compositions with the same composition. The same composition means that the type and amount of each component in the composition are the same. Thus, for example, although having the same color, inks different only in the coloring material content are not identical inks in the present embodiments.

The first line head 22a and the second line head 22b may be provided for every type of coloring ink composition or may be provided for some types of coloring ink composition. In any case, two or more line heads for ejecting an identical ink are provided for at least one ink. Two or more line heads for ejecting an identical ink may be provided for two or more inks, three or more inks, or four or more inks. Two or more line heads for ejecting an identical ink may be provided for five or more inks.

The term "coloring ink composition", as used herein, refers to an ink composition for coloring a recording medium. Examples of the coloring ink composition include non-white ink compositions for non-white coloring and white ink compositions for white coloring. Non-white ink compositions may be used to record images in which the qualities of pictures and letters are regarded as more important. White ink compositions can produce white ink images with high quality as background images of non-white ink images, and two or more ink jet heads may be provided for a white ink composition. A non-white ink composition and a white ink composition may be used as coloring ink compositions.

The first line head does not necessarily adjacent to the second line head. A line head for ejecting a different coloring ink composition may be located between the first line head and the second line head. Such a line head for ejecting a coloring ink composition different from the first line head and the second line head is referred to as a third line head. The third line head may be located upstream of the first line head or may be located downstream of the second line head. A line head for ejecting a different coloring ink composition located between the first line head and the second line head can increase the deposition time interval of a coloring ink composition on a recording medium between the first line head and the second line head, and the different coloring ink composition may be deposited in the interval.

The heating unit 30 includes a first heating unit 30a for heating a recording medium in one or both of the treatment liquid deposition step and the ink deposition step, a second heating unit 30b for heating the recording medium after the ink deposition step, and another optional heating unit.

The first heating unit 30a can heat a recording medium before the deposition of a treatment liquid or an ink composition or can immediately dry a treatment liquid or ink composition deposited. The surface of a recording medium has been heated before the deposition of a treatment liquid or an ink composition. The first heating unit 30a may be a platen heater. The heating unit may be a conductive heating unit, which transfers heat from a member in contact with a recording medium to the recording medium, a radiant heating unit, which exposes a recording medium to heat-producing radiation, such as infrared radiation, or a blower heating unit, which supplies hot air to a recording medium. These heating units may be used in combination.

The second heating unit 30b can further dry a treatment liquid or ink composition deposited and can further improve the scratch resistance of the resulting recorded matter. The second heating unit may be the same as the first heating unit but is independent of the first heating unit.

Figure 2:
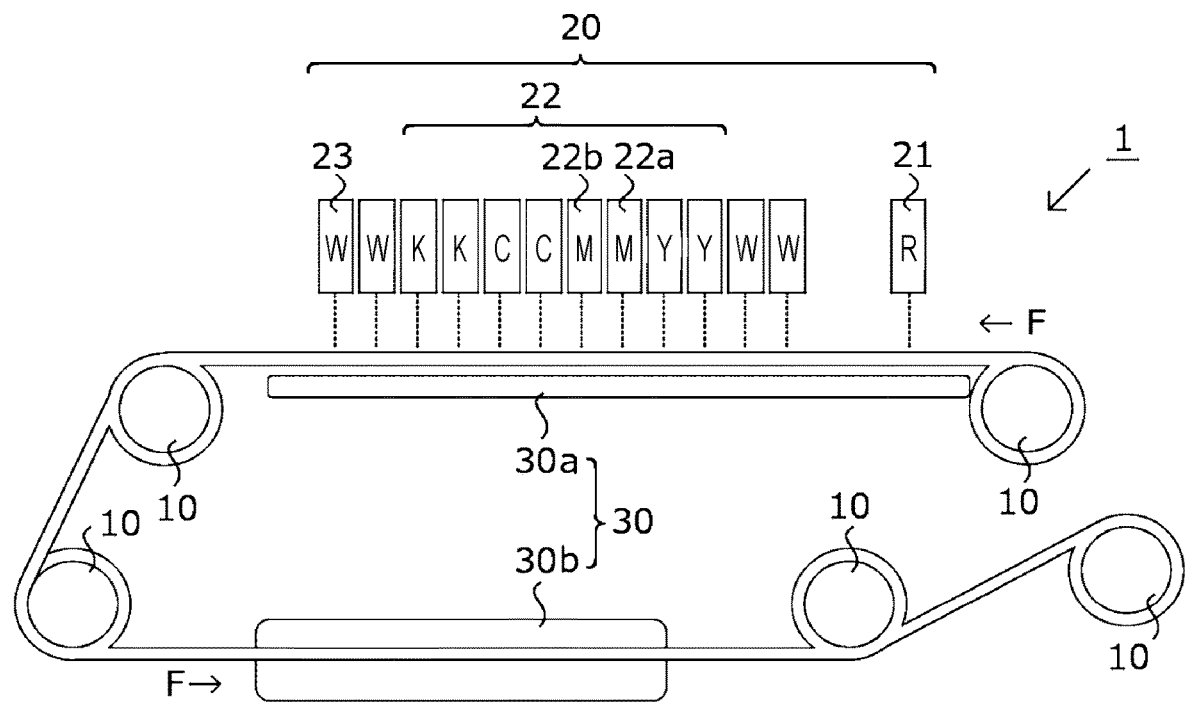
FIG. 2 is a schematic view of a line head arrangement example 2.

FIG. 2 illustrates another arrangement example of line heads. In this example, no line head for ejecting a different coloring ink composition is placed between the first line head and the second line head for ejecting an identical coloring ink composition in the transport direction. The example can reduce the deposition time interval of a coloring ink composition on a recording medium between the first line head and the second line head. The example can also reduce the distance between the first line head and the second line head in the transport direction. Except for these points, the recording apparatus illustrated in FIG. 2 may be the same as the recording apparatus illustrated in FIG. 1.

Figure 3:
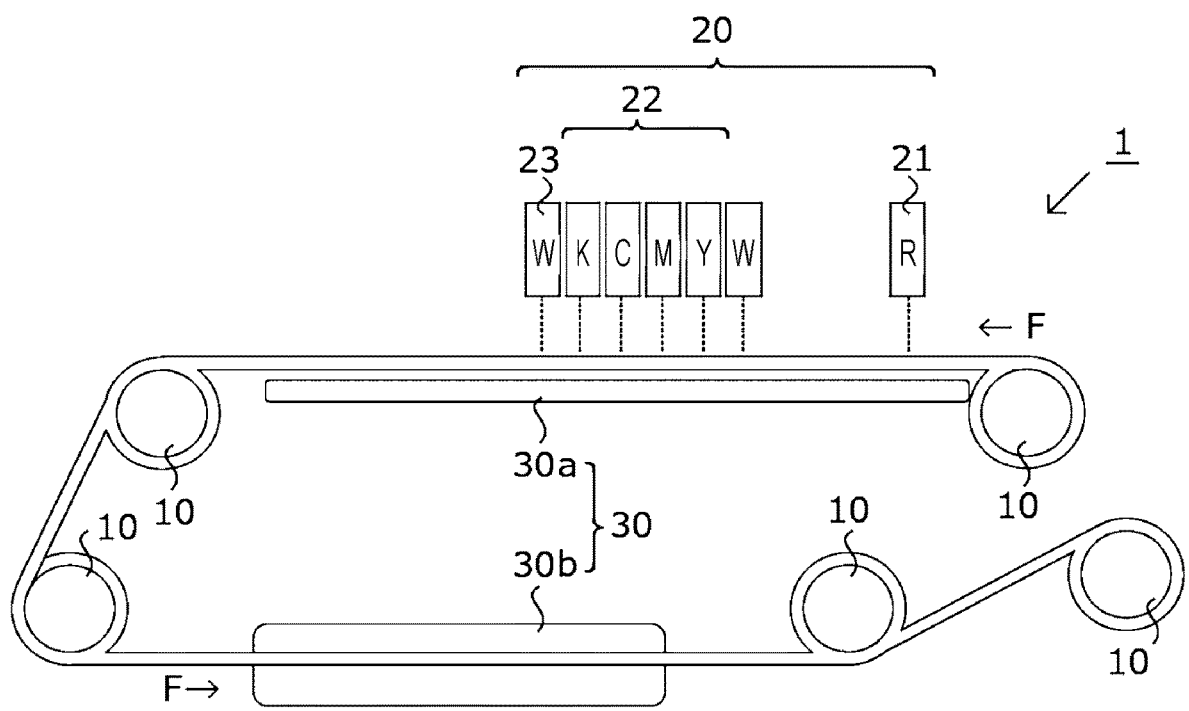
FIG. 3 is a schematic view of a line head arrangement example 3.

FIG. 3 illustrates another arrangement example of line heads. This example does not include two or more line heads for ejecting an identical coloring ink composition, except for white ink compositions. Recording with a white ink composition is performed by surface printing for viewing the recorded matter from the recording surface or by reverse printing for viewing the recorded matter from the opposite surface. In the surface printing, the white ink composition is ejected from a line head placed on the upstream side in the transport direction before a coloring ink composition other than the white ink composition is ejected. In the reverse printing, a coloring ink composition other than the white ink composition is ejected before the white ink composition is ejected from a line head placed on the downstream side in the transport direction. In the present example, for recording, a white ink composition is also not ejected from both a line head placed on the upstream side in the transport direction and a line head placed on the downstream side. The phrase "for recording", as used herein, refers to continuous recording by the surface printing or by the reverse printing without exchange between them. Thus, the present example does not include two or more line heads for ejecting an identical coloring ink composition for recording.

Except for these points, the recording apparatus illustrated in FIG. 3 may be the same as the recording apparatus illustrated in FIG. 1.

1.1. Treatment Liquid Deposition Step

The treatment liquid deposition step is the step of depositing a treatment liquid containing a coagulant on a recording medium. The treatment liquid may be deposited by any method, for example, by roller coating, spray coating, or ink jet coating. Among these, an ink jet method, particularly an ink jet method using a line head, may be employed to apply the treatment liquid to a recording medium. This enables the treatment liquid to be selectively applied to an intended portion and thereby reduces the amount of treatment liquid to be used, printing costs, and drying time. Furthermore, a line-type ink jet method may be used to improve dot landing accuracy and reduce printing time.

1.1.1. Treatment Liquid

The treatment liquid contains a coagulant as a component (a coagulant component) to increase the viscosity of an ink composition or to insolubilize an ink composition and optionally contains other components, such as a solvent and a surfactant.

1.1.1.1. Coagulant

Examples of the coagulant include, but are not limited to, polyvalent metal salts, organic acids, and cationic resins. The coagulant interacts with an ink composition and increases the viscosity of the ink composition or insolubilizes the ink composition. This can prevent landing interference and blurring of an ink composition subsequently deposited and enables lines and fine images to be uniformly drawn.

Specific examples of the treatment liquid to increase the viscosity of an ink composition or insolubilize an ink composition include treatment liquids that interact with the ink composition and precipitate or insolubilize a coloring material in the ink composition and treatment liquids that form a semisolid substance (gel) containing a coloring material in the ink composition. An interaction between an ink composition and the treatment liquid may be induced by an interaction between an anionic coloring material in the ink composition and a cationic compound in the treatment liquid, by mixing the ink composition and the treatment liquid with different pHs to change the pH of the ink composition, destroy the dispersion of a pigment in the ink composition, and aggregate the pigment, or by destroying the dispersion of a pigment in the ink composition by interaction with a polyvalent metal salt in the treatment liquid and aggregating the pigment.

The coagulant content may range from 1 to 15 parts by mass, 2 to 10 parts by mass, or 3 to 7 parts by mass per 100 parts by mass of the treatment liquid. A coagulant content within the above ranges tends to result in further improved image quality.

Examples of the polyvalent metal salts include, but are not limited to, polyvalent metal salts of inorganic acids and polyvalent metal salts of organic acids. Examples of the polyvalent metal salts include, but are not limited to, salts of the group 2 alkaline-earth metals of the periodic table (for example, magnesium and calcium), the group 3 transition metals of the periodic table (for example, lanthanum), the group 13 earth metals of the periodic table (for example, aluminum), and lanthanide series (for example, neodymium). Such polyvalent metal salts may be carboxylates (formates, acetates, and benzoates), sulfates, nitrates, chlorides, and thiocyanates. Examples of such polyvalent metal salts include calcium or magnesium salts of carboxylic acids (formates, acetates, and benzoates), calcium or magnesium salts of sulfuric acid, calcium or magnesium salts of nitric acid, calcium chloride, magnesium chloride, and calcium or magnesium salts of thiocyanic acid. These polyvalent metal salts may be used alone or in combination.

Examples of the organic acids include, but are not limited to, phosphoric acid, oxalic acid, malonic acid, citric acid, acetic acid, and propionic acid. Among these, monovalent, divalent, and polyvalent carboxylic acids may be used. Such carboxylic acids tend to further improve image quality. These organic acids may be used alone or in combination.

Examples of the cationic resins include, but are not limited to, cationic amine-based resins, polyurethane resins, and polyethyleneimine resins. These resins improve image quality. Examples of the amine-based resins include polyallylamine resins, polyamine resins, and polyamide resins. The polyallylamine resins, polyamine resins, and polyamide resins have a polyallylamine structure, a polyamine structure, and a polyamide structure, respectively, in their main skeletons. The cationic resins are cationic resin particles or water-soluble cationic resins and may be water-soluble cationic resins. Cationic resin particles are considered to be a coagulant.

These cationic polymers may have a weight-average molecular weight of 5000 or more or in the range of approximately 5000 to 100000. The weight-average molecular weight of each cationic polymer is measured by gel permeation chromatography using polystyrene standards.

1.1.1.2. Solvent

Examples of the solvent include, but are not limited to, organic solvents and water.

The water content may range from 80% to 99% by mass, 85% to 98% by mass, or 90% to 97% by mass of the total amount of the treatment liquid. The treatment liquid and the coloring ink composition may be an aqueous composition. The aqueous composition contains water as a main solvent, and the water content of the composition may be 45% or more by mass or 50% or more by mass.

Examples of the organic solvents include, but are not limited to, alkanediol solvents, such as 1,2-pentanediol, 1,2-hexanediol, 1,3-propanediol, 1,4-butanediol, 1,5-pentanediol, 1,6-hexanediol, 1,7-heptanediol, and 1,8-octanediol; and glycol ether solvents, such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, and dipropylene glycol monobutyl ether.

The organic solvent content may range from 1% to 30% by mass, 2% to 20% by mass, 3% to 15% by mass, or 4% to 10% by mass of the total amount of the treatment liquid. At an organic solvent content within the above ranges, the treatment liquid tends to have improved wettability, and a decrease in the solubility of the coagulant tends to be further reduced.

1.1.1.3. Surfactant

Examples of the surfactant include, but are not limited to, acetylenic glycol surfactants, silicone surfactants, and fluorinated surfactants.

The surfactant content may range from 0.1% to 3% by mass, 0.2% to 1% by mass, or 0.3% to 0.7% by mass of the total amount of the treatment liquid. A surfactant content within the above ranges tends to result in a treatment liquid with further improved wettability.

1.2. Heating Step

A recording method according to the present embodiment may include a heating step of heating a recording medium before or during the ink deposition step. This enables a coloring ink composition to be deposited on the heated recording medium in the ink deposition step and further improves image quality. A recording medium may be heated by any method, for example, with a heater or by ventilation. Heating with the first heating unit 30a corresponds to this. This is also referred to as a primary heating step. Heating with the second heating unit 30b corresponds to a secondary heating step.

1.3. Ink Deposition Step

In the ink deposition step, a coloring ink composition is ejected from line heads and is deposited on a recording medium, wherein the first line head and the second line head eject an identical coloring ink composition. When the first line head and the second line head eject an identical coloring ink composition, the amount of the identical coloring ink composition to be deposited for recording in a region of a recording medium may be divided between the first line head and the second line head. Thus, the amount of an identical coloring ink composition to be ejected from one line head and deposited in a region is divided between the first line head and the second line head. For example, with two line heads, the amount of identical ink composition to be deposited in a region, for example, in a 2 mm×2 mm region, in an image may be divided between the first line head and the second line head. The ratio of the amount of deposit from the first line head to the amount of deposit from the second line head may range from 1:2 to 2:1. This may result in further improved image quality.

In the ink deposition step, a coloring ink composition different from the identical coloring ink composition ejected from the first line head and the second line head may be ejected from a third line head placed between the first line head and the second line head. In the ink deposition step, an identical coloring ink composition different from the identical coloring ink composition ejected from the first line head and the second line head may be ejected from a line head placed on the upstream side in the transport direction and from a line head placed on the downstream side in the transport direction and may be deposited on the recording medium.

When two identical coloring inks are ejected from two line heads, each of which can eject two or more inks, the total number of line heads may be two. Alternatively, when one line head ejects only one coloring ink, the total number of line heads is four.

Thus, the total number of line heads depends on the number of coloring inks and the number of inks to be ejected from each line head.

In the ink deposition step, a white ink composition containing a white coloring material may be ejected from a line head and may be deposited on a recording medium. A line head for ejecting a white ink composition may be located on the most upstream side or on the most downstream side among the line heads for ejecting an ink composition. When a line head for ejecting a white ink composition is located on the most upstream side, a coloring ink composition is deposited on a white underlayer in the image. When a line head for ejecting a white ink composition is located on the most downstream side, a white image is formed on an image on which a non-white ink composition is deposited. When an image formed on a transparent recording medium with a line head for ejecting a white ink composition located on the most downstream side is viewed from a surface opposite the ink deposition surface, a non-white ink is deposited on a white background.

The number of line heads for ejecting a white ink composition may be the same as, larger than, or smaller than the number of line heads for ejecting an identical non-white ink composition. The number of line heads for ejecting a white ink composition may be smaller than the number of line heads for ejecting an identical non-white ink composition. When an image recorded with a white ink is a background image of an image of a non-white ink, the image recorded with the white ink is not directly visually recognized, and filling in the image recorded with the white ink is sometimes not as noticeable as that with the non-white ink. In such a case, the number of line heads for ejecting a white ink composition may be decreased.

A white ink may be deposited on a recording medium before or after a non-white ink. A white ink may be deposited on a recording medium after a non-white ink to improve filling with the white ink.

The maximum amount of one coloring ink composition deposited in a predetermined region of an image on a recording medium may range from 3 to 20 mg/inch$^2$, 5 to 15 mg/inch$^2$, or 5 to 12 mg/inch$^2$. The maximum amount of white ink deposited may range from 10 to 20 mg/inch$^2$.

The filling problem is not solved only by increasing the amount of coloring ink composition to be deposited with one line head. In the present disclosure, the maximum amount of coloring ink composition deposited within the above ranges may result in improved filling even compared with the case where the amount of coloring ink composition deposited with one line head is increased above these ranges.

The amount of treatment liquid deposited may range from 5% to 70% by mass, 10% to 50% by mass, or 10% to 40% by mass of the total amount of coloring ink deposited in the same region.

In the ink deposition step, a recording medium may have a surface temperature of 45° C. or less, 40° C. or less, 38° C. or less, or 35° C. or less. The recording medium may have a surface temperature of 20° C. or more, 25° C. or more, 30° C. or more, or 32° C. or more. A surface temperature within the above ranges tends to result in improved filling and further improved image quality. The surface temperature of a recording medium can be measured with a non-contact thermometer. The surface temperature of a recording medium in the ink deposition step is the maximum surface temperature of a portion of the recording medium facing a line head under recording.

In the ink deposition step, while a recording medium is transported in the transport direction, a coloring ink composition may be ejected from line heads and may be deposited on the recording medium. The transport speed of the recording medium may be 30 m/min or more, 40 to 150 m/min, 50 to 120 m/min, or 50 to 100 m/min. Although filling and image quality generally tend to be improved as the transport speed decreases, filling and image quality can be satisfactory even at a transport speed of 30 m/min or more in the present disclosure. Thus, the present disclosure is suitable for high-speed printing.

The nozzle density of one line head for ejecting an identical coloring ink composition may range from 200 to 1500 nozzles per inch (npi), 300 to 100 npi, or 500 to 700 npi in the width direction of a recording medium. This may result in further improved image quality or filling.

1.3.1. Coloring Ink Composition

A coloring ink composition contains a coloring material and optionally contains a solvent, fine resin particles, a surfactant, and other components.

1.3.1. Coloring Material

The coloring material is a pigment other than white or a white pigment. Examples of such a pigment include, but are not limited to, organic pigments, such as azo pigments (for example, azo lakes, insoluble azo pigments, condensed azo pigments, and chelate azo pigments), polycyclic pigments (for example, phthalocyanine pigments, perylene pigments, perinone pigments, anthraquinone pigments, quinacridone pigments, dioxazine pigments, thioindigo pigments, isoindolinone pigments, and quinophthalone pigments), nitro pigments, nitroso pigments, and aniline black; inorganic pigments, such as carbon black (for example, furnace black, thermal lampblack, acetylene black, and channel black), metal oxides, metal sulfides, and metal chlorides; and extender pigments, such as silica, calcium carbonate, and talc.

Specific examples of such pigments include, but are not limited to, C.I. Pigment Yellow 64, 74, 93, 109, 110, 128, 138, 139, 150, 151, 154, 155, 180, and 185, C.I. Pigment Red 122, 202, and 209, C.I. Pigment violet 19, C.I. Pigment Blue 15:3, 15:4, and 60, C.I. Pigment Green 7 (phthalocyanine green), 10 (green gold), 36, and 37, C.I. Pigment Brown 3, 5, 25, and 26, C.I. Pigment Orange 1, 2, 5, 7, 13, 14, 15, 16, 34, 36, 38, 64, and 71, carbon black (Pigment Black 7), and titanium oxide (Pigment White 6).

Examples of non-white coloring inks include cyan inks, yellow inks, magenta inks, black inks, orange inks, and green inks. Among these, cyan inks, yellow inks, magenta inks, and black inks may be used as process color inks to record picture and letter images. Examples of white coloring inks include white inks containing white pigments of metal oxides, such as titanium oxide.

The coloring material content may range from 1% to 15% by mass, 3% to 12.5% by mass, or 5% to 10% by mass of the total amount of the ink composition.

1.3.2. Solvent

Examples of the solvent include, but are not limited to, organic solvents and water.

The water content may range from 65% to 97% by mass, 70% to 95% by mass, or 75% to 90% by mass of the total amount of the ink composition.

An organic solvent tends to improve the wettability of the ink composition, further improve image quality, and further improve ejection stability. Examples of the organic solvents include, but are not limited to, alkanediol solvents, such as 1,2-pentanediol, 1,2-hexanediol, 1,3-propanediol, 1,4-butanediol, 1,5-pentanediol, 1,6-hexanediol, 1,7-heptanediol, and 1,8-octanediol; and glycol ether solvents, such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, and dipropylene glycol monobutyl ether.

The coloring ink composition may contain an alkanediol solvent or a glycol ether solvent as an organic solvent. This tends to improve filling, reduce blocking, and further improve image quality. Among these, an alkanediol solvent may be used.

The organic solvent may be an organic solvent with a normal boiling point in the range of 170° C. to 280° C. Such an organic solvent tends to improve filling, reduce blocking, and further improve image quality. Examples of the organic solvent with a normal boiling point in the range of 170° C. to 280° C. include, but are not limited to, 1,2-pentanediol (206° C.), 1,2-propanediol (188° C.), 1,3-propanediol (214° C.), 1,2-butanediol (193° C.), 3-methoxy-3-methyl-1-butanol (174° C.), 1,3-butanediol (207° C.), 1,4-butanediol (228° C.), 1,5-pentanediol (242° C.), 2-ethyl-1,3-hexanediol (244° C.), 2-butene-1,4-diol (235° C.), 1,2-hexanediol (223° C.), and 2-methyl-2,4-pentanediol (198° C.)

Examples of the alkanediol solvent include those described above and diols of alkanes having 2 or more carbon atoms. Examples of the alkanediol solvent include diols of alkanes having 2 to 10 carbon atoms. Examples of the alkanediol solvent include diols of alkanes having 5 to 10 carbon atoms. The alkanediol solvent may be a 1,2-alkanediol or a 1,2-alkanediol of an alkane having 5 or more carbon atoms. This may result in further improved image quality, anti-blocking, or scratch resistance. A diol of an alkane having 4 or less carbon atoms may also be used. This may result in further improved anti-clogging or filling. A diol of an alkane having 5 or more carbon atoms and a diol of an alkane having 4 or less carbon atoms may be used in combination.

Examples of the glycol ether solvent include those described above and etherification products of an alkane having 2 to 4 carbon atoms or intermolecular condensation products thereof via a hydroxy group. The number of repeating molecules in the intermolecular condensation may be 4 or less. The etherification may be alkyl etherification or may be alkyl etherification of 1 to 4 carbon atoms. The glycol ether solvent may be a monoether or diether or may be a monoether.

The organic solvent content may be 30% or less by mass, 20% or less by mass, 15% or less by mass, 10% or less by mass, or 7% or less by mass. The lower limit of the organic solvent content may be 0% or more by mass, 1% or more by mass, or 3% or more by mass. An organic solvent content within the above ranges tends to result in improved filling, reduced blocking, and improved image quality.

The amount of organic solvent with a normal boiling point of more than 280° C. in the coloring ink composition may be 1% or less by mass, 0.5% or less by mass, 0.1% or less by mass, or 0% by mass. This may result in further improved anti-blocking or scratch resistance.

1.3.3. Fine Resin Particles

Examples of resins forming the fine resin particles include, but are not limited to, urethane resins, acrylic resins, polyester resins, and polyether resins. This tends to result in an ink composition with improved fixability and recorded matter with further improved scratch resistance and water resistance.

The acrylic resins are polymer resins produced by polymerizing at least a (meth)acrylic monomer as a monomer component and may be resins of copolymers of a (meth)acrylic monomer and another monomer. Examples of the other monomer include vinyl monomers, such as styrene monomers. A styrene acrylic resin composed of a (meth)acrylic monomer and a styrene monomer may also be used.

The fine resin particle content may range from 1% to 20% by mass, 2% to 15% by mass, or 3% to 15% by mass of the total amount of the ink composition. The fine resin particle content may range from 4% to 10% by mass or 4% to 8% by mass. A fine resin particle content within the above ranges tends to result in recorded matter with further improved scratch resistance and water resistance.

1.3.4. Surfactant

Examples of the surfactant include, but are not limited to, silicone surfactants, acetylenic glycol surfactants, and fluorinated surfactants.

Examples of the silicone surfactants include polysiloxane compounds and polyether-modified organosiloxanes. Specific examples of commercial products of the silicone surfactants include, but are not limited to, BYK-306, BYK-307, BYK-333, BYK-341, BYK-345, BYK-346, BYK-347, BYK-348, and BYK-349 (trade names, manufactured by BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

The acetylenic glycol surfactants are not particularly limited. For example, at least one selected from 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol may be used. Examples of commercial products of the acetylenic glycol surfactants include, but are not limited to, Olfin 104 series and E series, such as Olfin E1010 (manufactured by Air Products Japan, Inc., trade names), and Surfynol 465 and Surfynol 61 (manufactured by Nissin Chemical Industry Co., Ltd., trade names). The acetylenic glycol surfactants may be used alone or in combination.

Examples of the fluorinated surfactants include, but are not limited to, perfluoroalkyl sulfonates, perfluoroalkyl carboxylates, perfluoroalkyl phosphates, perfluoroalkyl ethylene oxide adducts, perfluoroalkyl betaines, and perfluoroalkylamine oxide compounds. Examples of commercial products of the fluorinated surfactants include, but are not limited to, S-144 and S-145 (manufactured by Asahi Glass Co., Ltd.); FC-170C, FC-430, and Fluorad FC-4430 (manufactured by Sumitomo 3M Ltd.); FSO, FSO-100, FSN, FSN-100, and FS-300 (manufactured by DuPont); and FT-250 and FT-251 (manufactured by NEOS Co., Ltd.). The fluorinated surfactants may be used alone or in combination.

The surfactant content may range from 0.1% to 3% by mass, 0.2% to 1% by mass, or 0.3% to 0.7% by mass of the total amount of the ink composition. A surfactant content within the above ranges tends to result in an ink composition with further improved wettability.

1.3.5. Other Components

The ink composition may contain various additive agents, such as a dissolution aid, a viscosity modifier, a pH-adjusting agent, an antioxidant, a preservative, a fungicide, a corrosion inhibitor, and a chelating agent for trapping metal ions that affect dispersion, to maintain high storage stability of the ink composition and high stability of ejection from heads, improve clogging, or prevent degradation of the ink composition.

1.3.2. White Ink Composition

The white ink composition may be an ink composition with the same composition as described above except for containing a white pigment as a coloring material. Examples of the white pigment include, but are not limited to, white inorganic pigments, such as C.I. Pigment White 6, 18, and 21, titanium oxide, zinc oxide, zinc sulfide, antimony oxide, magnesium oxide, and zirconium oxide. In addition to these white inorganic pigments, white organic pigments, such as white hollow resin particles and polymer particles, may also be used.

1.3.3 Recording Medium

Examples of the recording medium include, but are not limited to, absorbing recording media, low-absorbing recording media, and non-absorbing recording media. Among these, low-absorbing recording media and non-absorbing recording media may be used, and non-absorbing recording media may be used. The present disclosure is particularly useful for non-absorbing recording media, which are inferior in filling.

The terms "low-absorbing recording media" and "non-absorbing recording media", as used herein, refers to recording media that absorb 10 mL/m$^2$ or less of water in 30 milliseconds after the beginning of contact in the Bristow method. The Bristow method is the most widely used method for measuring the amount of liquid absorbed in a short time. The Bristow method has also been adopted by Japan Technical Association of the Pulp and Paper Industry (JAPAN TAPPI). The details of the Bristow method is described in specification No. 51 "Kami Oyobi Itagami—Ekitai Kyushusei Siken Houhou—Bristow Hou" in "JAPAN TAPPI Test Methods", 2000.

Non-absorbing or low-absorbing recording media may also be classified by the water wettability of the recording surface. For example, a recording medium can be characterized by dropping 0.5 µL of water on a recording surface of the recording medium and measuring the reduction rate in contact angle (a comparison in contact angle between 0.5 milliseconds and 5 seconds after landing). More specifically, the non-absorbing property of a recording medium refers to a reduction rate of less than 1%, the low-absorbing property refers to a reduction rate of 1% or more and less than 5%, and the absorbing property refers to a reduction rate of 5% or more. The contact angle can be measured with a portable contact angle meter PCA-1 (manufactured by Kyowa Interface Science Co., Ltd.).

Examples of the absorbing recording media include, but are not limited to, plain paper, such as electrophotographic paper with high permeability to ink compositions, ink jet paper (ink jet paper with an ink-absorbing layer formed of silica particles or alumina particles or with an ink-absorbing layer formed of a hydrophilic polymer, such as poly(vinyl alcohol) (PVA) or polyvinylpyrrolidone (PVP)), and art paper, coated paper, and cast paper with relatively low permeability to ink compositions for use in general offset printing.

Examples of the low-absorbing recording media include, but are not limited to, coated paper with a surface coating layer for receiving oil-based inks. Examples of the coated paper include, but are not limited to, actual printing paper, such as art paper, coated paper, and matte paper.

Examples of the non-absorbing recording media include, but are not limited to, plastic films without an ink-absorbing layer, substrates, such as paper, coated with a plastic, and substrates, such as paper, covered with a plastic film. Examples of the plastic include poly(vinyl chloride), poly(ethylene terephthalate), polycarbonate, polystyrene, polyurethane, polyethylene, and polypropylene.

2. Recording Apparatus

A recording apparatus according to the present embodiment is a line-type recording apparatus for scanning a recording medium with a plurality of line heads once for recording, the line heads having a width greater than or equal to the recording width of the recording medium, the line-type recording apparatus including a treatment liquid deposition mechanism of depositing a treatment liquid containing a coagulant on the recording medium and a first line head and a second line head as the line heads to eject an identical coloring ink composition for recording, the first line head being placed on the upstream side in the transport direction of the recording medium, the second line head being placed on the downstream side in the transport direction of the recording medium.

The recording apparatus can be used in the recording methods according to the above embodiments and can be used to perform the recording methods.

EXAMPLES

The present disclosure is more specifically described in the following examples and comparative examples. The present disclosure is not limited to these examples.

1. Ink Composition and Treatment Liquid

The components listed in Table 1 were well mixed to prepare ink compositions and treatment liquids. More specifically, the components were homogeneously mixed and were filtered to remove insoluble materials, thus producing inks and treatment liquids. The values in Table 1 are based on the mass percentage, and the total is 100.0% by mass.

Each pigment was premixed with a styrene acrylic pigment dispersant resin not shown in the table at a pigment:pigment dispersant resin mass ratio of 3:2 in water in a bead mill to prepare a pigment dispersion liquid. The pigment dispersion liquid and the other components were used to prepare an ink composition.

The following are main components of ink compositions and treatment liquids used in the examples and comparative examples.

Coloring Materials
   Pigment Blue 15:3
   Pigment Red 122
   Pigment Yellow 155
   Carbon black (Pigment Black 7)
   Titanium oxide pigment (Pigment White 6)
Coagulants
   Calcium propionate
   Cationic polymer (amine-epichlorohydrin condensation polymer (trade name: Catiomaster PD-7, manufactured by Yokkaichi Chemical Co., Ltd.))
   Succinic acid
Resin
   AN-1190S (manufactured by DIC Corporation, trade name: Voncoat AN-1190S, Tg: 25° C., acrylic resin) Organic solvents 1,2-propanediol (boiling point: 188° C.)
1,2-hexanediol (boiling point: 223° C.)
Diethylene glycol monobutyl ether (boiling point: 230° C.) Surfactants
BYK-348 (silicone surfactant, manufactured by BYK Japan KK)
pH-Adjusting Agent
   Triisopropanolamine
Fungicidal Preservative Agent
   Proxel XL2 (manufactured by Lonza Japan Ltd.)

The arrangement 1 included as coloring ink line heads two line heads W for ejecting a white ink of an ink 7 on the most upstream side and two line heads W for ejecting the white ink on the most downstream side. A line head Y for ejecting a yellow ink of an ink 5, a line head M for ejecting a magenta ink of an ink 4, a line head C for ejecting a cyan ink of inks 1 to 3, a line head K for ejecting a black ink of an ink 6, another line head Y, another line head M, another line head C, and another line head K were arranged between the line heads W from the upstream side. Thus, the arrangement 1 included two line heads Y, two line heads M, two line heads C, and two line heads K.

The arrangement 2 included as coloring ink line heads two line heads W for ejecting a white ink of an ink 7 on the most upstream side and two line heads W for ejecting the white ink on the most downstream side. Two line heads Y, two line heads M, two line heads C, and two line heads K were arranged between the line heads W from the upstream

TABLE 1

| | | Ink No. | | | | | | | |
|---|---|---|---|---|---|---|---|---|---|
| | | Ink 1 | Ink 2 | Ink 3 | Ink 4 | Ink 5 | Ink 6 | Ink 7 | Ink 8 |
| Coloring material | pigment blue 15:3 | 7 | 7 | 7 | | | | | 7 |
| | pigment red 122 | | | | 7 | | | | |
| | pigment yellow 155 | | | | | 7 | | | |
| | carbon black | | | | | | 7 | | |
| | titanium oxide pigment | | | | | | | 15 | |
| Coagulant | calcium propionate | | | | | | | | |
| | cationic polymer | | | | | | | | |
| | succinic acid | | | | | | | | |
| Resin | AN-1190S | 5 | 5 | 5 | 5 | 5 | 5 | 5 | 5 |
| Organic solvents | 1,2-propanediol | | 5 | 5 | | | | | |
| | 1,2-hexanediol | 5 | 5 | 12 | 5 | 5 | 5 | 5 | 2 |
| | Diethylene glycol monobutyl ether | | | | | | | | |
| Surfactant | BYK348 | 0.5 | 0.5 | 0.5 | 0.5 | 0.5 | 0.5 | 0.5 | 0.5 |
| pH-adjusting agent | Triisopropanolamine | 0.1 | 0.1 | 0.1 | 0.1 | 0.1 | 0.1 | 0.1 | 0.1 |
| Fungicidal preservative agent | Proxel XL2 | 0.1 | 0.1 | 0.1 | 0.1 | 0.1 | 0.1 | 0.1 | 0.1 |
| | pure water | remainder | remainder | remainder | remainder | remainder | remainder | remainder | remainder |
| | Total | 100 | 100 | 100 | 100 | 100 | 100 | 100 | 100 |

| | | Ink No. | | | Treatment liquid No. | | |
|---|---|---|---|---|---|---|---|
| | | Ink 9 | Ink 10 | Ink 11 | Treatment liquid 1 | Treatment liquid 2 | Treatment liquid 3 |
| Coloring material | pigment blue 15:3 | 7 | 7 | 7 | | | |
| | pigment red 122 | | | | | | |
| | pigment yellow 155 | | | | | | |
| | carbon black | | | | | | |
| | titanium oxide pigment | | | | | | |
| Coagulant | calcium propionate | | | | 5 | | |
| | cationic polymer | | | | | 5 | |
| | succinic acid | | | | | | 5 |
| Resin | AN-1190S | 5 | 5 | 2 | | | |
| Organic solvents | 1,2-propanediol | 5 | | | | | |
| | 1,2-hexanediol | | | 5 | 5 | 5 | 5 |
| | Diethylene glycol monobutyl ether | | 5 | | | | |
| Surfactant | BYK348 | 0.5 | 0.5 | 0.5 | 0.5 | 0.5 | 0.5 |
| pH-adjusting agent | Triisopropanolamine | 0.1 | 0.1 | 0.1 | 0.1 | 0.1 | 0.1 |
| Fungicidal preservative agent | Proxel XL2 | 0.1 | 0.1 | 0.1 | 0.1 | 0.1 | 0.1 |
| | pure water | remainder | remainder | remainder | remainder | remainder | remainder |
| | Total | 100 | 100 | 100 | 100 | 100 | 100 |

2. Recording Test

A converted printer of L-4533A manufactured by Seiko Epson Corporation was used as a line printer. The line printer had a plurality of fixed line heads. Regarding the arrangement of the line heads, FIG. 1 illustrates an arrangement 1, FIG. 2 illustrates an arrangement 2, and FIG. 3 illustrates an arrangement 3. The line printer included a first heating unit and a second heating unit.

side. Thus, the arrangement 2 included two line heads Y, two line heads M, two line heads C, and two line heads K.

The arrangement 3 included as coloring ink line heads one line head W for ejecting a white ink of an ink 7 on the most upstream side and one line head W for ejecting the white ink on the most downstream side. One line head Y, one line head M, one line head C, and one line head K were arranged between the line heads W from the upstream side. Thus, the arrangement 3 included one line head Y, one line head M, one line head C, and one line head K.

Each line head had a nozzle density of 600 npi in the width direction of the recording medium.

Each converted printer had a line head for a treatment liquid located upstream of the line heads for the coloring inks. In each converted printer, a treatment liquid could be deposited on the recording medium F transported in the transport direction, and subsequently an ink composition from each line head could be deposited. Deposition of the treatment liquid and deposition of the ink from each head could be performed in a single pass for recording.

Each converted printer was used to deposit the treatment liquid and subsequently deposit the ink composition from each line head, thereby forming a test pattern. Table 2 lists the amounts of coloring ink compositions (non-white inks) deposited. When a plurality of non-white coloring ink compositions were used, the same amounts of coloring ink compositions were deposited, and the total amount of deposited ink compositions was listed in Table 2. When two line heads for ejecting an identical ink were used, the same amounts of the ink were deposited from the two line heads.

In a recording test, in addition to the non-white inks the white ink was used. The line heads W located upstream of the line heads for the non-white inks were not used, and the line heads W located downstream of the line heads for the non-white inks were used. After the non-white coloring ink compositions were deposited, 15 mg/inch$^2$ of the white ink was deposited from the downstream line heads W. A solid pattern of the white ink was deposited on a solid pattern of the non-white inks for recording. In all the examples, the amount of the white ink deposited was described above. When two line heads W were used, the same amounts of the ink were deposited from the two line heads W.

When one non-white ink was used, the line head C was used. When four non-white inks were used, the line heads C, M, Y, and K were used. The number of line heads for ejecting an identical non-white ink was two in the arrangements 1, 1' (described below), and 2, or one in the arrangement 3.

The white ink was the ink 7 in all the examples. The number of line heads for ejecting an identical white ink was two in the arrangements 1 and 2 or one in the arrangement 3. The arrangement 1' was the same as the arrangement 1 except that only the most downstream line head of the two downstream line heads W was used among the line heads W. In the arrangement 3, the number of line heads for ejecting an identical coloring ink for recording was not two. When the number of line heads for ejecting an identical coloring ink was two, the same amounts of the ink were deposited from the two line heads in a region of an image on the recording medium.

Reference Example 1 included an arrangement example 4. Although not shown in the figure, the arrangement example 4 was a serial printer with a serial head. Three 1-inch heads with the same nozzle density as in the above line heads were arranged on a carriage in the main scanning direction. Main scanning and sub-scanning were alternately performed. In the main scanning, a composition was ejected while the carriage was moved in the main scanning direction. In the sub-scanning, the recording medium was transported. The treatment liquid, the white ink, and one non-white ink were ejected from each head. The three compositions were ejected from the three heads. The treatment liquid, the non-white ink, and the white ink were successively deposited. One composition was deposited in 4 passes for recording. The transport length in single sub-scanning was approximately a quarter of the length of the head in the sub-scanning direction, and one composition was deposited in the same region four times by main scanning. After one composition was deposited, the recording medium was returned, and the compositions were successively deposited. The heating conditions were the same as in the arrangement 1.

The recording medium was formed of oriented polypropylene (OPP) (Pylen P2102 manufactured by Toyobo Co., Ltd.). The amount of treatment liquid deposited was 10% by mass of the total amount of ink deposited.

During recording, an ink deposition surface of a portion of the recording medium facing a head was heated to a temperature listed in Table 2 with the first heating unit 30a, which was a platen heater. In Example 5, the platen heater was turned off, and the recording medium had a surface temperature of 25° C.

The recording medium on which the ink compositions were deposited was dried at a recording medium temperature of 75° C. (maximum temperature) with the second heating unit 30b, which was a carbon heater, located downstream of the line heads.

2. Evaluation Method 2.1. Filling

The test pattern of the non-white ink composition(s) was visually inspected from a surface opposite the ink deposition surface of the recording medium through the transparent recording medium. The test pattern was visually inspected for the presence of the white ink seen as a linear streak (also referred to as a white streak) in the transport direction because the white ink did not overlap the non-white ink deposited on the observation side. In the case of poor filling with ink in line printers, no ink is deposited on some portion due to slightly wrong positioning of a nozzle or a wrong landing position, and a streak can be seen in the transport direction. Filling was rated according to the following evaluation criteria.

Evaluation Criteria

A: No white line was seen.

B: A narrow white line was slightly seen.

C: A white line was slightly seen, and a bold line was also slightly seen.

D: A bold white line was noticeable.

In the evaluation results marked with * in Table 2, in addition to the above evaluation, when also viewed from the front (the side of the white ink image) of the recording medium, a streak of the non-white ink composition was seen in the pattern of the white image because the streak was not filled with the white ink. The streak seen from the front of the recording medium included a few narrow lines and did not affect the evaluation of the coloring ink composition viewed from the back side.

2.2. Image Quality

The test pattern of the coloring ink composition(s) was visually inspected from a surface opposite the ink deposition surface of the recording medium through the transparent recording medium. The image quality was rated according to the following evaluation criteria.

Evaluation Criteria

A: Different concentrations of uneven aggregates were not seen in the pattern.

B: Different concentrations of fine uneven aggregates less than 0.5 mm in size were seen in the pattern.

C: Different concentrations of uneven aggregates 0.5 mm or more and less than 2 mm in size were seen in the pattern.

D: Different concentrations of uneven aggregates 2 mm or more in size were seen in the pattern.

2.3. Blocking

A surface of the recording medium without deposited inks was placed on an ink deposition surface of another recording medium and was pressed at a load of 5 kgf/cm$^2$ at 40° C. for 24 hours in a blocking tester (Tester Sangyo Co., Ltd., CO-201 permanent strain tester). After the recording media were separated, the degree of transfer of the image was determined. The blocking properties were rated according to the following evaluation criteria.

Evaluation Criteria

A: There was no tackiness, and the image was not transferred.

B: Although there was slight tackiness, the image was not transferred.

C: Less than 50% by area of the image was transferred.

D: 50% by area or more of the image was transferred.

2.4. Scratch Resistance

The ink deposition surface of the recording medium was subjected to reciprocating friction 10 times at a rate of 30 reciprocations per minute under a load of 200 g with a rubbing white cotton cloth wetted with water to an approximately 100% wet condition in a Gakushin-type rubbing fastness tester (Tester Sangyo Co., Ltd., AB-301) and was visually inspected. The scratch resistance was rated according to the following evaluation criteria.

Evaluation Criteria

A: The image was not blurred after the reciprocating friction 10 times or more.

B: Although there were a few peeling scratches after the reciprocating friction 10 times, the image was not blurred.

C: The image was blurred after the reciprocating friction 5 to 9 times.

D: The image was blurred after the reciprocating friction 4 times or less.

2.5. Anti-Clogging

Simulated recording, in which no ink was ejected from nozzles, was continuously performed for a predetermined time under the recording conditions described above. After the predetermined time, the presence of misfiring from a nozzle of each coloring ink line head or a wrong landing position (deviation) was examined. The clogging was rated according to the following evaluation criteria.

Evaluation Criteria

A: After simulated recording for 120 minutes or more, there were no nozzle with deviation or misfiring.

B: Although there were no nozzle with deviation or misfiring after simulated recording for 60 minutes, there was a nozzle with deviation or misfiring after simulated recording for 120 minutes.

C: Although there were no nozzle with deviation or misfiring after simulated recording for 30 minutes, there was a nozzle with deviation or misfiring after simulated recording for 60 minutes.

D: Although there were no nozzle with deviation or misfiring after simulated recording for 10 minutes, there was a nozzle with deviation or misfiring after simulated recording for 30 minutes.

TABLE 2

| | Head arrangement | Treatment liquid | Non-white ink | Number of line heads for ejecting identical ink (non-white) | White ink | Number of line heads for ejecting identical ink (white) |
|---|---|---|---|---|---|---|
| Example 1 | Arrangement 1 | Treatment liquid 1 | Ink 1 | 2 | Ink 7 | 2 |
| Example 2 | Arrangement 2 | Treatment liquid 1 | Ink 1 | 2 | Ink 7 | 2 |
| Example 3 | Arrangement 1 | Treatment liquid 1 | Ink 1 | 2 | Ink 7 | 2 |
| Example 4 | Arrangement 1 | Treatment liquid 1 | Ink 1 | 2 | Ink 7 | 2 |
| Example 5 | Arrangement 1 | Treatment liquid 1 | Ink 1 | 2 | Ink 7 | 2 |
| Example 6 | Arrangement 1 | Treatment liquid 1 | Ink 1 | 2 | Ink 7 | 2 |
| Example 7 | Arrangement 1 | Treatment liquid 2 | Ink 1 | 2 | Ink 7 | 2 |
| Example 8 | Arrangement 1 | Treatment liquid 3 | Ink 1 | 2 | Ink 7 | 2 |
| Example 9 | Arrangement 1 | Treatment liquid 1 | Ink 2 | 2 | Ink 7 | 2 |
| Example 10 | Arrangement 1 | Treatment liquid 1 | Ink 3 | 2 | Ink 7 | 2 |
| Example 11 | Arrangement 1 | Treatment liquid 1 | Inks 1, 4-6 | 2 | Ink 7 | 2 |
| Example 12 | Arrangement 1' | Treatment liquid 1 | Inks 1, 4-6 | 2 | Ink 7 | 1 |
| Example 13 | Arrangement 1 | Treatment liquid 1 | Ink 8 | 2 | Ink 7 | 2 |
| Example 14 | Arrangement 1 | Treatment liquid 1 | Ink 9 | 2 | Ink 7 | 2 |
| Example 15 | Arrangement 1 | Treatment liquid 1 | Ink 10 | 2 | Ink 7 | 2 |
| Example 16 | Arrangement 1 | Treatment liquid 1 | Ink 11 | 2 | Ink 7 | 2 |
| Comparative example 1 | Arrangement 3 | Treatment liquid 1 | Ink 1 | 1 | Ink 7 | 1 |
| Comparative example 2 | Arrangement 1 | — | Ink 1 | 2 | Ink 7 | 2 |
| Comparative example 3 | Arrangement 3 | Treatment liquid 1 | Ink 1 | 1 | Ink 7 | 1 |
| Comparative example 4 | Arrangement 3 | — | Ink 1 | 1 | Ink 7 | 1 |
| Reference example 1 | Arrangement 4 | Treatment liquid 1 | Ink 1 | 1 | Ink 7 | 1 |

| | Transfer speed (m/min) | Surface temperature of recording medium with deposited ink (° C.) | Amount of non-white ink deposited (mg/inch$^2$) | Filling | Image quality | Blocking | Scratch resistance | Anti-clogging |
|---|---|---|---|---|---|---|---|---|
| Example 1 | 50 | 35 | 10 | B | B | B | B | B |
| Example 2 | 50 | 35 | 10 | C | A | B | B | B |

TABLE 2-continued

| | | | | | | | | |
|---|---|---|---|---|---|---|---|---|
| Example 3 | 30 | 35 | 10 | A | A | A | B | B |
| Example 4 | 80 | 35 | 10 | C | C | C | B | B |
| Example 5 | 50 | 25 | 10 | A | C | C | B | A |
| Example 6 | 50 | 40 | 10 | C | A | A | A | C |
| Example 7 | 50 | 35 | 10 | A | A | C | A | B |
| Example 8 | 50 | 35 | 10 | B | C | A | C | B |
| Example 9 | 50 | 35 | 10 | B | B | B | C | A |
| Example 10 | 50 | 35 | 10 | A | B | C | C | A |
| Example 11 | 50 | 35 | 10 | B | B | B | B | A |
| Example 12 | 50 | 35 | 10 | B* | B | B | B | A |
| Example 13 | 50 | 35 | 10 | B | A | A | A | C |
| Example 14 | 50 | 35 | 10 | C | B | B | B | A |
| Example 15 | 50 | 35 | 10 | C | B | C | B | B |
| Example 16 | 50 | 35 | 10 | C | A | A | C | A |
| Comparative example 1 | 50 | 35 | 10 | D* | C | B | B | B |
| Comparative example 2 | 50 | 35 | 10 | A | D | A | A | B |
| Comparative example 3 | 50 | 35 | 15 | D* | C | B | A | B |
| Comparative example 4 | 50 | 35 | 10 | A | D | A | A | B |
| Reference example 1 | 50 | 35 | 10 | B | A | B | B | B |

3. Evaluation Results

Table 1 lists the ink composition and treatment liquid composition used in each example. Table 2 lists the evaluation results in each recording method.

The examples that involved the treatment liquid, the coloring ink(s), and two line heads for ejecting an identical coloring ink had good filling and high image quality.

In contrast, the comparative examples had poor filling or image quality. Details are described below.

Examples 1 and 2 show that separation between the first line head and the second line head improved filling. An arrangement of the first line head adjacent to the second line head improved image quality.

Examples 3 and 4 show that although a lower transport speed resulted in better filling, higher image quality, and better blocking properties, the present embodiments ensure filling, image quality, and blocking properties even at a high transport speed.

Examples 5 and 6 show that a lower surface temperature of the recording medium during ink deposition resulted in better filling and anti-clogging. Even for the recording medium with a high surface temperature, however, the present embodiments ensure filling and anti-clogging.

Examples 9, 10, and 13 show that a higher organic solvent content of the ink resulted in better filling and anti-clogging. In the present embodiments, however, a lower organic solvent content of the ink(s) resulted in better blocking resistance and scratch resistance. Even in such a case, the present embodiments ensure filling.

Examples 11 and 12 show that when four inks were used as non-white inks useful images could be recorded with process color inks. Examples 11 and 12 also show that both the first line head and the second line head were not necessarily required for the white ink. This is probably because a white ink image is a background image of a non-white ink image and therefore does not significantly affect the image, and the non-white ink decreases reactivity with the treatment liquid and prevents filling from being significantly decreased. Example 11 shows that also for the white ink the use of both the first line head and the second line head improved filling in the white image.

Although not shown in the table, when the white ink was deposited before the non-white inks in Example 12 using the most upstream line head W located upstream of the line heads for the non-white inks in the transport direction instead of the line head W located downstream of the line heads for the non-white inks in the transport direction in the arrangement 1', a streak of the white ink was more noticeable from the white image side than in Example 12. This shows that deposition of the white ink after the non-white inks resulted in better filling with the white ink even with fewer line heads for ejecting the white ink.

Examples 1, 14, and 15 show that the use of the alkanediol solvents as organic solvents for the inks improved image quality. The alkane diol having 4 or less carbon atoms improved anti-clogging, and the alkane diol having 5 or more carbon atoms improved filling. The glycol ether solvent could also be used as an organic solvent.

Comparative Examples 1 and 3 included one line head for ejecting an identical coloring ink composition and were inferior in filling. Although the amount of deposited ink was increased in Comparative Example 3, filling was not improved.

In Comparative Examples 2 and 4, no treatment liquid was used, and the resulting recorded matter had poor image quality. Although one line head for ejecting an identical coloring ink composition was used in Comparative Example 4, filling was not poor.

Reference Example 1 was an example recorded by a serial recording method. Although one head for ejecting an identical coloring ink composition was used, filling was not poor. However, high speed recording was impossible.

What is claimed is:

1. A recording method for using a line-type recording apparatus to scan a recording medium with a plurality of line heads once for recording, the line heads having a width greater than or equal to a recording width of the recording medium, the method comprising:
    a treatment liquid deposition step of depositing a treatment liquid containing a coagulant on the recording medium; and
    after the treatment liquid deposition step:
    a white ink deposition step of ejected a white ink composition from the line heads to deposit the white ink composition on the recording medium, wherein in the white ink deposition step, the white ink composition is ejected from a first white line head placed on an upstream side in a transport direction perpendicular to a width direction of the recording medium and an identical white ink composition is ejected from a second white line head placed on a downstream side in the transport direction, each of the white ink composition and the identical white ink composition containing a white coloring material; and a non-white ink deposition step of ejected a non-white ink composition from the line heads to deposit the non-white ink composition on the recording medium, wherein in the non-white ink deposition step, the non-white ink composition is ejected from a first non-white line head placed on an upstream side in a transport direction perpendicular to a width direction of the recording medium and an identical non-white ink composition is ejected from a second non-white line head placed on a downstream side in the transport direction, each of the non-white ink composition and the identical non-white ink composition containing a non-white coloring material, and each of the non-white ink composition and the identical non-white ink composition are one of a cyan ink, a yellow ink, a magenta ink, and a black ink, the first white line head and the second white line head are located in the transport direction downstream of the first non-white line head and the second non-white line head or located in the transport direction upstream of the first non-white line head and the second non-white line head, and the white ink composition, the identical white ink composition, the non-white ink composition, the identical non-white ink composition, and the treatment liquid are each aqueous compositions.

2. The recording method according to claim 1, wherein in the non-white ink deposition step a coloring ink composition different from the non-white coloring ink composition ejected from the first line head and the identical non-white ink coloring composition ejected from the second line head is ejected from a third line head placed between the first non-white line head and the second non-white line head.

3. The recording method according to claim 1, wherein in the non-white ink deposition step an identical coloring ink composition different from the non-white coloring ink composition ejected from the first non-white line head and the identical non-white ink composition ejected from the second non-white line head is ejected from a line head placed on the upstream side in the transport direction and from a line head placed on the downstream side in the transport direction and is deposited on the recording medium.

4. The recording method according to claim 1, wherein the white ink deposition step and the non-white ink deposition step are each performed while the recording medium is transported in the transport direction at a transport speed of 30 m/min or more.

5. The recording method according to claim 1, further comprising:
a heating step of heating the recording medium before or during the non-white ink deposition step,
wherein the non-white ink composition and the identical non-white ink composition are each deposited on the heated recording medium in the non-white ink deposition step.

6. The recording method according to claim 1, wherein the non-white ink composition and the identical non-white ink composition are each deposited on the recording medium with a surface temperature of 45° C. or less in the non-white ink deposition step.

7. The recording method according to claim 1, wherein the non-white ink composition and the identical non-white ink composition each contain an organic solvent, and
an organic solvent content is 15% or less by mass of a total amount of the non-white coloring ink composition and the identical non-white ink composition.

8. The recording method according to claim 1, wherein the non-white ink composition and the identical non-white ink composition each contain an organic solvent with a normal boiling point of 170° C. to 280° C.

9. The recording method according to claim 1, wherein the non-white ink composition and the identical non-white ink composition each contain an alkanediol solvent or a glycol ether solvent as the organic solvent.

10. The recording method according to claim 1, wherein the non-white ink composition and identical non-white ink composition each contain fine resin particles, and
a fine resin particle content ranges from 1% to 15% by mass of a total amount of the non-white ink composition and the identical non-white ink composition.

11. The recording method according to claim 1, wherein the recording medium is a non-absorbing recording medium.

12. The recording method according to claim 1, wherein a maximum amount of the non-white ink composition and identical non-white ink composition deposited ranges from 5 to 15 mg/inch$^2$.

13. The recording method according to claim 1, wherein an image of the white ink composition and an image of the non-white ink composition overlap, and
the line heads from which the white ink composition is ejected is located in the transport direction downstream of the first line head and the second line head from which the identical coloring ink composition is ejected.

14. The recording method according to claim 1, wherein the coagulant includes at least one of a polyvalent metal salt, an organic resin, and a cationic resin.

15. The recording method according to claim 1, wherein the coagulant is configured to react with a coloring material of the coloring ink composition.

16. The recording method according to claim 1, wherein the coloring ink composition is a white ink composition containing a white coloring material.

17. The recording method according to claim 1, wherein the non-white ink composition and the identical non-white ink composition are each cyan ink compositions, the first non-white line head is a first cyan line head and the second non-white line head is a second cyan line head, and
the non-white ink deposition step further comprises at least one of:
ejecting a yellow ink composition from a first yellow line head and ejecting an identical yellow ink composition from a second yellow line head located downstream in the transport direction from the first yellow line head;
ejecting a magenta ink composition from a first magneta line head and ejecting an identical magenta ink composition from a second magenta line head located downstream in the transport direction from the first magenta line head; and
ejecting a black ink composition from a first black line head and ejecting an identical black ink composition from a second black line head located downstream in the transport direction from the first black line head.

18. The recording method according to claim 1, wherein the plurality of line heads includes a treatment liquid line head, and in the treatment liquid deposition step, the treatment liquid is ejected from the treatment liquid line head and deposited on the recording medium.

* * * * *